UNITED STATES PATENT OFFICE.

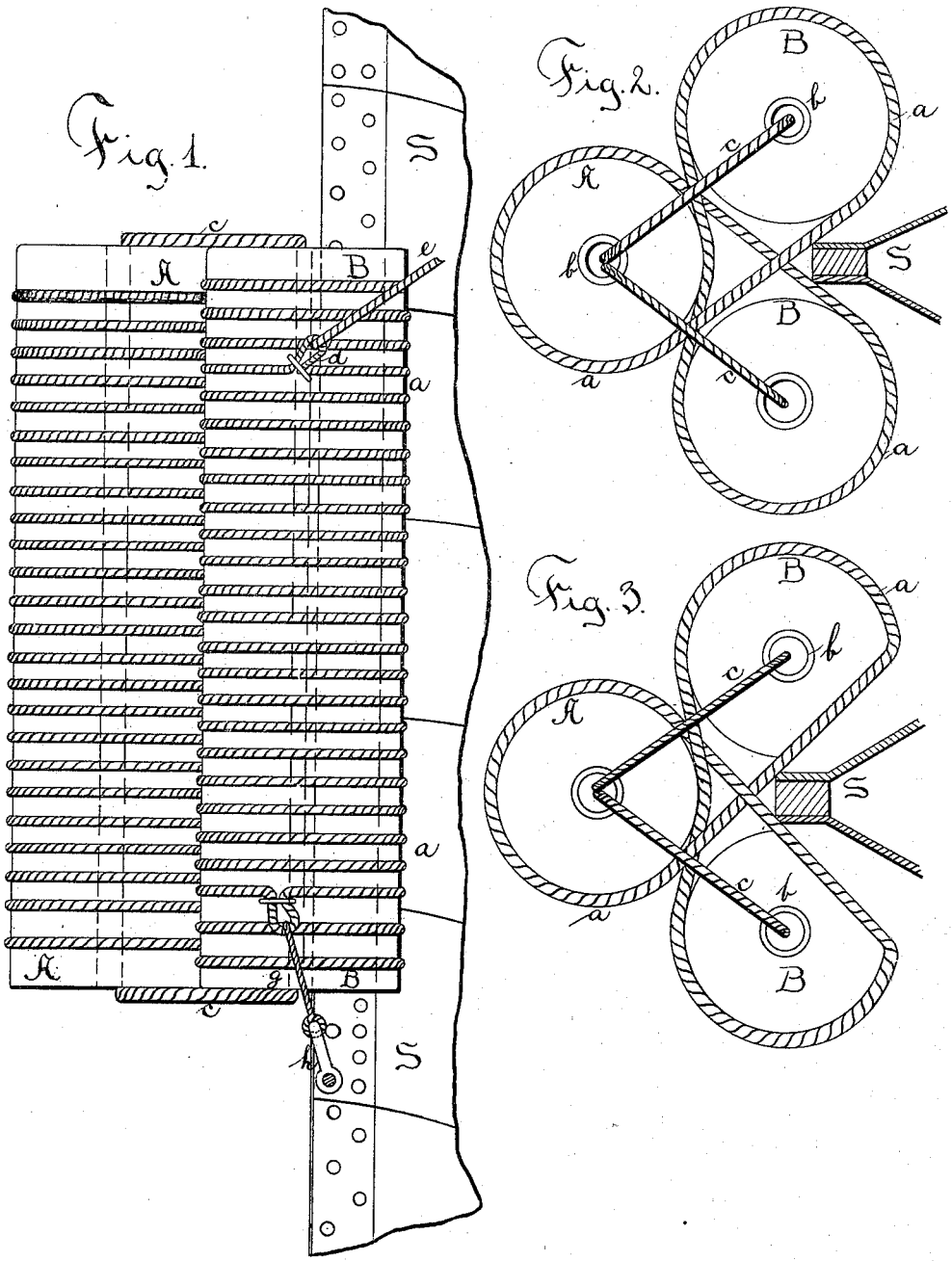

FRIEDRICH GERHARD NIELSEN, OF SONDERBURG, GERMANY.

FENDER FOR SHIPS.

SPECIFICATION forming part of Letters Patent No. 638,469, dated December 5, 1899.

Application filed April 5, 1899. Serial No. 711,851. (No model.)

*To all whom it may concern:*

Be it known that I, FRIEDRICH GERHARD NIELSEN, a subject of the German Emperor, residing at Sonderburg, Germany, have invented certain new and useful Improvements in Fenders for Ships; and I do hereby declare the following to be a full, clear, and exact description of the invention, such as will enable others skilled in the art to which it appertains to make and use the same.

The present invention relates to improvements in fenders for vessels; and its object is to provide a fender to be attached to the stem of a vessel to receive the force of a colliding vessel or other body and act like a buffer, whereby the stem is prevented from chafing or cutting too deep into the opposing body, and thus serious injury to both is avoided.

In the accompanying drawings, forming a part of this specification, Figure 1 is a side elevation of a fender constructed in accordance with my invention. Fig. 2 is a plan view of the same. Fig. 3 is a plan of a slightly-modified fender.

The stem-fender consists of three fender-poles A B B, which are roped together in such a manner that the forward pole A, which may have a relatively larger diameter, is situated directly in front of the stem, while the two others, B B, which may be flattened, Fig. 3, at the sides opposed to the stem, are placed at either side of and somewhat to the rear of the stem. The fender-poles are made of cork, cane, or bamboo or other suitable material and are inclosed in strong sail-cloth. The three fenders are connected with each other by means of a rope $a$ $a$ (made of hemp, cocoanut fiber, or steel) in such a manner that the turns of the rope cross each other everywhere. The rope, which leaves one of the rear fender-poles B at the hind part, is carried around the front fender A and goes to the hind part of the other fender B, from where it is carried across the back of the front fender A, back again to the hind fender B. Through the center of each fender-pole there passes a cane or tube $b$, and through this tube $b$ passes a rope $c$, by means of which a further connection of the fenders is made in a vertical direction.

In hazy weather the stem-fender is placed in position before the stem S. If necessary, the capstan may be employed to effect this. The fender is fastened to the stem at its lower part by ropes $g$ and ring $h$ and at its upper part by the ropes $e$, passing through loops $d$, which lead up to both sides of the upper deck. When a collision occurs, a lateral displacement of stem-fender cannot go so far, be the direction from which the collision comes at a right, obtuse, or acute angle, that the stem S is freed of the fender, as when a pressure occurs against the front fender A the stem at once penetrates deeply into the rope windings, while the back fenders B B lie closely against the sides of the stem S. This latter action is more perfect when the rear fenders have that portion of their peripheries adjacent the stem flattened, as shown in Fig. 3, whereby the point of crossing of the ropes $a$ is brought closer to the stem S.

The enormous power which is required to either break the numerous convolutions of rope or, if they resist, to cut through the fender at many places will materially lessen the force of the collision, so that any great damage is impossible.

Having thus described my invention, I claim—

1. In combination, with the stem of a vessel, a fender consisting of a pole A forward of and directly in line with the stem, poles B to either side of and slightly in rear of said stem and connected with pole A by a series of convolutions of rope crossing each other in front of the stem, and means for securing the fender to the prow, substantially as described.

2. In combination with the stem of a vessel, a fender consisting of a pole A forward of and directly in line with the stem, poles B to either side of and slightly in rear of said stem and having their peripheries flattened to conform therewith, a protecting-covering as sail-cloth for each of said poles, a series of convolutions of rope connecting said poles and crossing each other in front of the stem, a tube $b$ centrally located in each of said poles, a rope $c$ passed therethrough, and means for securing the fender to the stem, substantially as described.

In testimony whereof I affix my signature in presence of two witnesses.

FRIEDRICH GERHARD NIELSEN.

Witnesses:
G. HERMES,
EUGEN STEMBURG.